United States Patent [19]

Ercolano

[11] 3,868,288

[45] Feb. 25, 1975

[54] PRODUCING AN APPLIQUE THERMOPLASTIC ARTICLE

[76] Inventor: Andrew Ercolano, 30 Haywood St., Bound Brook, N.J. 08805

[22] Filed: July 3, 1972

[21] Appl. No.: 268,636

[52] U.S. Cl................... 156/248, 156/250, 156/245, 156/500, 161/122, 161/DIG. 3, 161/138, 161/119, 161/413, 2/49 R, 2/111, 150/0.5
[51] Int. Cl......................... B32b 31/00, B32b 3/00
[58] Field of Search ....... 161/122, DIG. 3; 156/245, 156/248, 250

[56] References Cited
UNITED STATES PATENTS

| | | | |
|---|---|---|---|
| 1,376,778 | 5/1921 | Orr | 156/245 X |
| 3,496,043 | 2/1970 | Ragan | 161/122 X |
| 3,523,055 | 8/1970 | Lemelson | 161/43 |
| 3,523,860 | 8/1970 | Prohaska et al. | 161/122 |

*Primary Examiner*—George F. Lesmes
*Assistant Examiner*—Patricia C. Ives
*Attorney, Agent, or Firm*—Michael S. Striker

[57] ABSTRACT

To produce an applique article a layer of thermoplastic sheet material is placed onto a substrate so that a surface of the layer is exposed. The layer is thereupon heated and softened, and is then pressed at selected portions of the surface against and into bonding engagement with the substrate. The remaining portions of the surface of the layer are subjected to suction so as to lift them off the substrate and form them into a raised three-dimensional pattern.

4 Claims, 5 Drawing Figures

PATENTED FEB 25 1975　　3,868,288

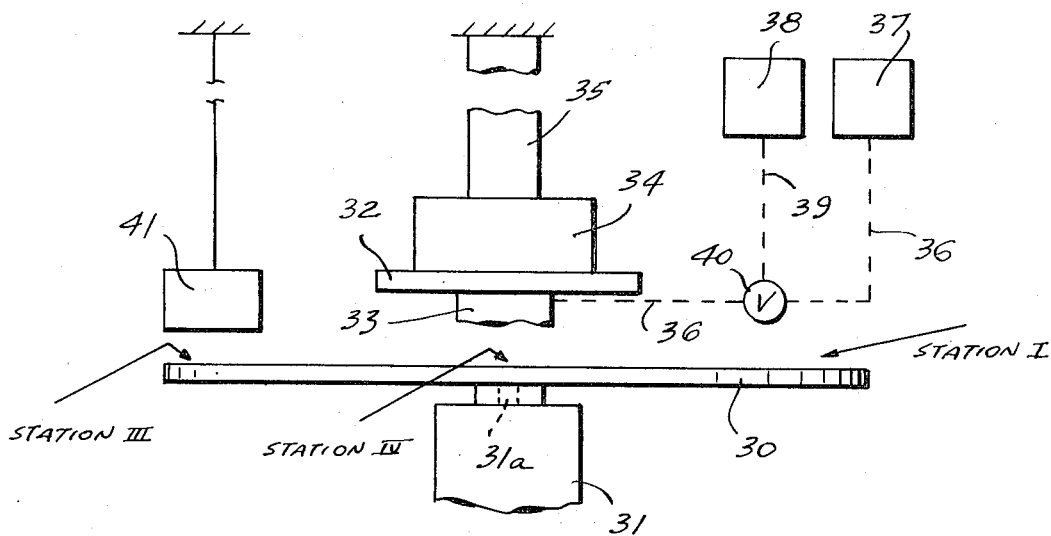
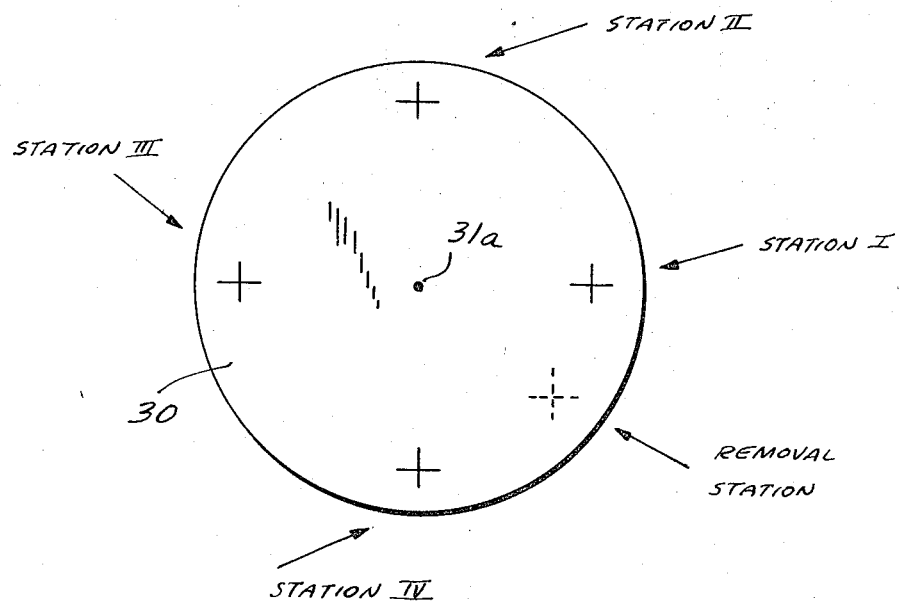

PRODUCING AN APPLIQUE THERMOPLASTIC ARTICLE

BACKGROUND OF THE INVENTION

The present invention relates generally to applique articles and more particularly to a novel applique article, to a method of making the same and to an apparatus for carrying out the method.

Applique articles of the type here under discussion are known. Basically, they are produced by placing onto a substrate a layer of thermoplastic sheet material, with a layer of padding material — such as foam plastic, fibrous sliver or the like — interposed between them, whereupon the thus obtained assembly is pressed together by a die in respective desired bonding zones and is subjected to the action of a high-frequency generator. This causes the thermoplastic sheet material and, if the padding material is of the appropriate type, the padding material also, to become heated and bonded to the substrate. During the pressing-together of the assembly, and the subsequent heating and bonding, the padding material collapses in the region where the compressing force is exerted, but remains unchanged in the regions where no such force is exerted. The resulting applique article thus has a three-dimensional effect because it is padded by the padding material everywhere except in the bonding zones.

However, this prior art teaching still has certain drawbacks. In particular, the height of the raised three-dimensional pattern which can be obtained is not as substantial as will frequently be desired. Furthermore, it is not possible to provide special effects on the surface of the layer of thermoplastic sheet material during the making of the applique article, for instance pebbling or sculpturing effects.

SUMMARY OF THE INVENTION

Accordingly, it is a general object of the present invention to further improve on what is already known from the prior art.

More particularly, it is an object of the present invention to provide an improved applique article of the type here under discussion.

Another object of the invention is to provide an improved method of producing such an applique article, and in particular a method which permits the raised three-dimensional pattern of the applique article to have greater height or depth.

Another object of the invention is to provide such a method which permits the exposed surface of the applique article to be provided with special effects.

Another object of the invention is to provide an apparatus for carrying out the novel method.

In pursuance of the above objects and of others which will become apparent hereafter, one feature of the invention resides in a method of producing an applique article which method comprises the steps of placing a layer of thermoplastic sheet material onto a substrate so that a surface of the layer is exposed. The layer is thereupon heated and softened, and the softened thermoplastic sheet material is pressed at selected portions of its surface against and bonded to the substrate. The remaining portions of the surface of the layer of thermoplastic sheet material are subjected to a suction requisite for lifting these remaining portions off the substrate and forming a raised three-dimensional pattern.

If desired, and if particularly large remaining portions of the surface are being formed with a three-dimensional pattern, or again if the height or depth of the pattern is to be particularly substantial, a layer of padding material may be interposed between the layer of thermoplastic sheet material and the substrate. Such padding material may be a fibrous sliver, but can particularly advantageously be formed of one of the various synthetic plastic foam materials which are well known in the art and which are preferably of thermoplastic character.

The layer of thermoplastic sheet material is advantageously of polyvinyl chloride and the suction is applied by vacuum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a diagrammatic side-elevational view of an apparatus according to the present invention;

FIG. 4 is a diagrammatic top-plan view of the turntable of the apparatus in FIG. 3, illustrating the various work stations of the apparatus.

DESCRIPTION OF THE PREFERRED EMBODIMENTS

Figure 1:
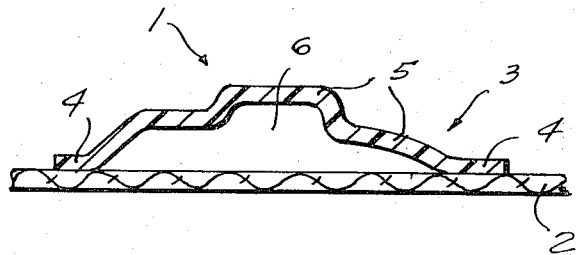
FIG. 1 is a fragmentary vertical section through an applique article according to the present invention.

Discussing firstly FIG. 1, to establish the concept of the novel applique article, it will be seen that reference numeral 1 identifies the article per se. Reference numeral 2 identifies a substrate which may for instance be a fabric such as a textile material. Such a fabric may be a piece of yard goods, it may be a garment, e.g. a child's sweatshirt, a baby's bib, or the like) or it may be another article, for instance a handbag, wallpaper or the like.

Provided on the substrate 2 is a layer 3 of synthetic plastic sheet material, preferably a polyvinyl chloride. The layer 3 is bonded to the substrate 2 in what will be seen in FIG. 1 to be a single circumferentially complete annular bonding zone 4. Such bounding can be effected under the influence of heat and pressure in accordance with what is already well known from the prior art.

It is desired to provide the area 5 of the layer 3, that is the area which in FIG. 1 is surrounded by the zone 4, with a raised three-dimensional pattern, that is with a pattern in relief. This is accomplished in FIG. 1, as is clearly evident, and between the area 5 and the underlying surface of the substrate 2 there is provided a hollow space 6. This space is empty, that is it does not contain any solids, but at most gaseous matter. If it is important that air be entrapped in the space 6 and/or the entry of fluid be prevented into the space 6, and assuming that the material of the substrate 2 is fluid-permeable, then a layer of fluid-impermeable sheet material may be placed against the side of the substrate 2 which faces away from the layer 3, before the latter is bonded to the substrate 2. By appropriate bonding this additional fluid impermeable layer will be bonded to the opposite sides of the substrate 2 at the same time as the layer 3 is bonded to the latter, and because the bonding zone 4 is circumferentially complete, the interior of the space 6 will thus be sealed against entry or escape of fluid.

It is evidently possible to provide any desired pattern in relief on the area 5, for instance a pattern of flowers, animals, symbols or the like. This will depend entirely upon the die which is used for the purpose, as will be discussed subsequently.

Figure 2:
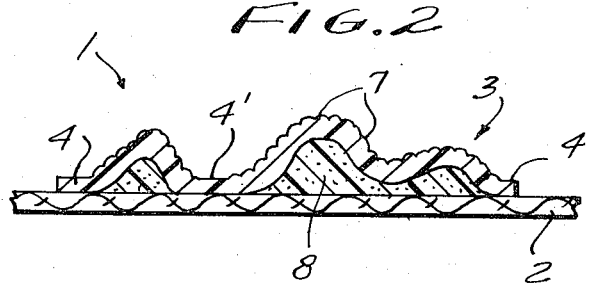
FIG. 2 is a view similar to FIG. 1, but illustrates an applique article according to a further embodiment of the invention.

The embodiment in FIG. 2 is largely reminiscent of FIG. 1. It indicates, however, some further concepts according to the present invention. On the one hand it will be seen that the space 6 need not be empty, but can be filled with a filler material, here identified as synthetic plastic foam material, although it is for instance also possible to use a fibrous sliver. The use of such foam material, identified with reference numeral 8 in FIG. 2, is not a prerequisite for the basic concept of the present invention but, if the surface area over which the relief pattern is provided is particularly large or if the height or depth of the relief pattern is partially substantial, it may be desired to support the layer 3 by the provision of the material 8. The latter will of course act as a padding material, and it will be appreciated, that it is not necessary that to completely fill the space 6, that is that the material 8 is in contact with the underside of the portion 5 of the layer 3, although this may normally be the case.

Further, FIG. 2 shows that the bonding of the layer 3 to the substrate 2 need of course not be confined to the circumferentially complete annular zone 4, but that the layer 3 can be bonded to the substrate 2 at other zones, such as the one identified with reference numeral 4', which may or may not be annular. This will of course depend upon the pictorial representation provided by the relief pattern, that is whether the representation requires an inner bonding zone (such as the zone 4') and whether this inner bonding zone (or zones) should be straight, curved, annular and also circumferentially complete or not.

Finally, FIG. 2 also shows that the exposed surface of the layer 3, that is the surface facing away from the substrate 2, may be provided with a desired visual and/or tactile effect, here illustrated in form of grain or pebbles 7. If, for instance, the raised relief pattern resembles a flower, then the pebbles 7 may simulate pollen, or other effects may of course be provided.

Coming now to FIGS. 3 and 4 it will be seen that therein I have illustrated rather diagrammatically an apparatus for making the article which is illustrated in FIGS. 1 and 2 by way of example. The apparatus in FIG. 3 comprises a turntable 30 which can be turned by a drive 31 having an output shaft 31a which is connected with the turntable 30. Such turntables and the associated drives are too well known to require detailed discussion. The surface of the turntable 30 serves for supporting an assembly which is to be converted into an applique article, for instance a substrate and a synthetic plastic layer such as shown in FIGS. 1 and 2. It is advantageous but again not absolutely essential that there be provided four operating stations, which may be arranged as indicated in FIG. 4 where they are designated as stations I, II, III and IV. At station I the substrate may be placed upon the turntable 30 to be conveyed by the latter (which may turn continuously but which advantageously will turn stepwise) to station II where the layer of thermoplastic material is placed upon the substrate. The thus provided assembly would then be advanced to station III where the layer of thermoplastic material is heated to become softened, and from there the assembly is then conveyed to station IV where the bonding of the layer of thermoplastic material to the substrate is effected while at the same time the raised three-dimensional pattern of the area 5 of the layer 3 is produced.

The finished article may be removed at the diagrammatically illustrated removal station (see FIG. 4), but it should be understood that the removal station may also be located otherwise, and that the arrangement of the stations I-IV may be other than that illustrated. For instance, station II could be omitted and a complete assembly composed of substrate 2 and layer 3 (and, if desired, foam layer 8) can be placed upon the turntable at station I. Similarly, it will be understood that it is not necessary to utilize a turntable for the conveying of the various components from stations to stations, but that other means are conceivable, for instance a conveyor belt or the like.

Returning, however, to FIG. 3, it will be seen that in this embodiment there is located at the station IV (compare FIG. 4) a platen 32 which carries on its side directed towards the upper surface of the turntable 30, a die 33 which will subsequently be discussed in more detail with reference to FIG. 5.

In addition, the platen 32 carries a high frequency generator which is well known to those skilled in the art and is, for instance, of the type disclosed in U.S. Pat. No. 2,946,713 of Peter Dusina et al. The generator 34 could of course be located elsewhere but for convenience is provided on the platen 32 in the illustrated embodiment. The platen 32, the die 33 and the generator 34 can be raised upwardly away from and lowered downwardly towards the upper surface of the turntable 30 by the diagrammatically illustrated means 35, for instance a hydraulically or pneumatically operated cylinder and piston unit, or other suitable means.

Arranged so as to act upon an assembly located at the station III is a heat source 41 which may be an infrared radiator, or a battery of them. If the layer 3 is of polyvinyl chloride which, I have found is, advantageously but not necessarily of 10 gauge thickness, then the heat source 41 should supply approximately 300°F. heat. The material of the layer 3 requires heating to approximately 250°F., so that it softens and becomes "rubbery" in consistency. The purpose is to permit it to be formed by suction at the station IV, as will be discussed subsequently.

Figure 5:
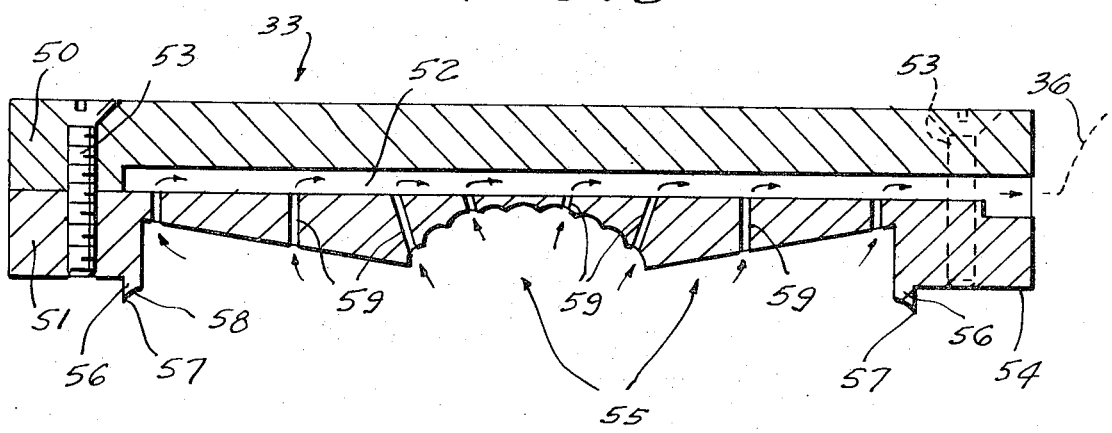
FIG. 5 is a sectional elevation of a die in accordance with the present invention.

The interior of the die 33, which will be discussed with respect to FIG. 5, is connected via conduit 36 with a diagrammaticaly illustrated suction source, for instance a vacuum pump 37 which is known per se and requires no detailed discussion. Interposed in the conduit 36 is a valve 40 which communicates with a branch conduit 39, the latter in turn communicating with a source of compressed gas (usually air) 38. There is at least at times a tendency for the assembly composed of the layers 2 and 3, or 2, 3 and 8 to adhere to the die 33 when the bonding and forming process is completed and the platen 32 has been raised to the position illustrated in FIG. 3. In that case it is necessary to separate the assembly from the die, which is effected by disconnecting the die 33 from the vacuum pump 37 via the valve 40 and instead connecting it via conduit 36 with the source 38 from which a flow of compressed air is admitted into the die 33 to blow the assembly out of engagement therewith.

The vacuum pressure produced by the source 37 may be approximately 15 pounds, although it may be higher, for instance up to about 25 pounds.

Coming now to FIG. 5, wherein a die according to the present invention has been illustrated by way of example, it will be seen that this die is composed of an upper portion 50 and a lower portion 51 which are connected with one another in suitable manner, for instance by means of the screws 53. The surface of the portion 50 which faces the portion 51 is recessed to form a vacuum chamber 52 which is connected with the conduit 36. The free surface of the portion 51 is identified with reference numeral 54 and provided, if for instance only a single circumferentially complete bonding zone 4 is to be provided (as in FIG. 1) with a contact or pressing face 58 formed on a circumferentially complete annular rib 56 projecting from the surface 54. Outwardly adjacent the surface 58 the rib 56 is formed with a cutting edge 57 which projects farther from the surface 54 than the surface 58.

Within the confines surrounded by the rib 56, the surface 54 is provided with a recess 55 which may be in form of several different portions of greater or lesser depth. In other words, the contour or configuration of the recess 55 is a negative of the three-dimensional relief pattern which it is desired to produce in the layer 3. It should be noted that at the center of the recess 55 the inner surface of this recess is provided with pebble-like depressions which will create the pebble effect of FIG. 2. Of course, such depressions can also be provided elsewhere and they can be omitted or they can be of different shape.

In any case, the recess 55 is provided with a plurality of air passages 51 communicating with the vacuum chamber 52. Advantageously these air passages 59 should be evenly distributed over the entire surface area of the recess 55. Their diameter will be about 1/64 of an inch, but this dimension can vary.

It will be appreciated that when the die 33 of FIG. 5 is used in the apparatus of FIG. 3, it will be lowered with the platen 32 and the welder 34 onto an assembly whose layer 3 has been heated and softened at the station III and which has now arrived at the station IV. When the die 33 is lowered into engagement with the layer 33, the cutting edge 57 will cut through the layer 3 (and the foam layer 8, if such is present) and of course the cutting edge 57 can be so dimensioned that it will also cut through the substrate 2 should this be desired. In any case, as the cutting edge 57 cuts through the layer 53, the surface 58 will press against the layer 3 pressing a circumferentially complete annular portion of the same against the surface of the substrate 2. At this time, the recess 55 is sealed against the ambient atmosphere by engagement of the surface 58 and the cutting edge 57 with the layer 3. At this time, also, the high-frequency generator 34 is energized, heating the rib 56 and causing the material of the thermoplastic layer to become heat-welded to the substrate 2 in the zone 4 which corresponds to the area engaged by the surface 58. How this takes place is well known and requires no detailed discussion.

The chamber 52 may normally be in constant communication with the vacuum source 37, or it may be placed into such communication as the die 33 moves downwardly towards the assembly. In any case, as the communication of the recess 55 with the ambient atmosphere is cut off by engagement of the cutting edge 57 and the surface 58 with the layer 3, the suction effect of the source 37 begins to act, raising the material of the layer 3 (which is soft from the influence of the heat source 41) into engagement with the inner surface bounding the recess 55. Such engagement causes the portion of the layer 3 which is located within the confines of the recess 55 to faithfully assume the contour of the inner surface bounding the recess 55, and also to assume the surface effect provided on this surface, for instance the pebbly effect. The material of the layer 3 will of course remain softened only for a short period of time and will set in the configuration which has been imparted to it by the suction exerted via the aperture 59.

The die 33 is now raised and if the finished article should adhere to it, the interior of the chamber 52 is disconnected from the vacuum source 37 and connected with the pressure source 38 by operation of the valve 40. The compressed air which now enters the chamber 52 blows the applique article off the die 33 via the apertures 59. Naturally, it is possible to have the chamber 52 become connected with the pressure source 38 during each and every operation irrespective of whether in a particular instance, the finished article may separate from the die 33 by itself or adhere to it. The means required for effecting the connection of the chamber 52 with the source 37 and the source 38 at the various time, do not form a part of the present invention and are too well known to require discussion.

The vinyl sheet which is advantageously used for the layer 3 may be of the soft and flexible type or it may be of the rigid type. Appropriate selection of the amount of heat imparted to it at the station III will cause it to become sufficiently soft to permit its forming in the die 33.

The operation is the same as was described even if a layer 8 of foam or the like is utilized. In that case the thermoplastic foam will melt in the region engaged under pressure by the face 38 but will remain in the region surrounded by the bounding zone 4 (see FIG. 2). Naturally, if inner bonding zones such as the one identified with reference numeral 4' in FIG. 2 are to be provided, the die 33 must be appropriately configurated. Whether such inner bonding zones 4' are to be provided, where they are located and what configuration they will have, depends upon the particular relief pattern to be produced. If the zone or zones 4' should be circumferentially complete, so that for instance the recess 55 has within it a separate recess which will be sealed from the remainder of the recess 55 when the zones 4 and 4' are simultaneously being produced, then it will be realized that each of these recesses must be provided with apertures 59 communicating with the vacuum chamber 52.

The present invention makes it possible to produce an applique article in which a grain effect, or pebbly effect can be readily produced in a single operation on the surface of the layer 3, which cannot be done according to the prior art except by depressing the layer across the foam (which in the prior art must be present) and "spot-welding" it to the substrate. This is frequently disadvantageous or undersired and at least in some instances causes the formation of a corresponding bulge at the reverse side of the substrate. By contrast, the present invention avoids these difficulties and makes it possible to obtain relief patterns having a height or depth of one quarter inch or more, requiring either no foam or similar padding material or, where the same is provided, making it possible to emboss or sculpt the thermoplastic sheet material layer without having to depress the foam or analogous material down to the substrate and adhering it thereto, as was previously required.

It will be understood that each of the elements described above, or two or more together may also find a useful application in other types of applications, differing from the types described above.

While the invention has been illustrated and described as embodied in the producing of applique articles, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Method of producing an applique article, comprising the steps of placing a layer of thermoplastic sheet material into a substrate so that a surface of said layer is exposed; heating and softening said layer of thermoplastic sheet material; pressing the softened thermoplastic sheet material at selected portions of said surface against and bonding it to said substrate, one of said selected portions being a circumferentially complete annular bonding zone; subjecting the remaining portions of said surface of the layer of said heated thermoplastic sheet material, while said selected portions are bonded to said substrate, to a suction requisite, for lifting said remaining portions off said substrate; vacuum-forming a three-dimensional pattern in said remaining portions of the softened thermoplastic sheet material concomitantly with the step of lifting said remaining portions by suction; and cutting through at least said layer outwardly adjacent and along said annular bonding zone, at least said pressing step, said suction step, said forming step and said cutting step being carried out simultaneously.

2. A method as defined in claim 1; and further comprising the step of interposing a layer of padding material between said substrate and said layer of thermoplastic sheet material prior to heating and softening of the latter.

3. A method as defined in claim 1, wherein the step of subjecting said remaining portions of said layer to a suction comprises applying a vacuum to said remaining portions.

4. A method as defined in claim 1, wherein the step of pressing said selected portions against said substrate comprises engaging said surface with a die having projecing ribs including at least one circumferentially complete annular rib which engage said selected surface portions, and recesses intermediate said ribs; and wherein the step of subjecting said remaining portions to a suction comprises applying a vacuum to said recesses so as to draw said intermediate portions into the latter.

* * * * *